United States Patent
Tatsumi (10) Patent No.: US 6,396,564 B2
(45) Date of Patent: *May 28, 2002

(54) PHOTOGRAPHIC PRINTING SYSTEM AND PHOTOGRAPHIC PRINTING METHOD

(75) Inventor: Setsuji Tatsumi, Kanagawa (JP)

(73) Assignee: Fuji Photo Film Co., LTD, Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,223

(22) Filed: Jun. 10, 1999

(30) Foreign Application Priority Data

Jun. 10, 1998 (JP) .......................................... 10-162051
Jun. 2, 1999 (JP) .......................................... 11-154967

(51) Int. Cl.⁷ ..................... G03B 27/52; G03B 27/32; G03B 17/24
(52) U.S. Cl. .......................... 355/40; 355/27; 396/311; 396/319
(58) Field of Search ................... 396/310, 311, 396/319, 321, 564; 355/40, 41, 27, 28, 29, 39

(56) References Cited

U.S. PATENT DOCUMENTS 5,701,530 A * 12/1997 Fujino ........................ 396/311
5,819,126 A * 10/1998 Kitagawa et al. ............ 396/319
5,831,714 A * 11/1998 Yoshikawa ................... 355/40
5,886,774 A * 3/1999 Nishida et al. ............... 355/40
6,047,140 A * 4/2000 Yoshikawa ................. 396/310

FOREIGN PATENT DOCUMENTS

JP      A 6-9869      8/1995
JP      A 0-7539      7/1997

* cited by examiner

Primary Examiner—Russell Adams
Assistant Examiner—Peter B. Kim
(74) Attorney, Agent, or Firm—Sughrue Mion, PLLC (57) ABSTRACT

A photographic film, which is accommodated in a cartridge provided with a storing element for storing printing information, is separated from the cartridge. An identification mark for having the film and the cartridge correspond to one another is applied to the film. The printing information stored in the storing element is read by a first reading device. The printing information read by the first reading device and the identification mark are stored in correspondence with each other. The printing information corresponding to the identification mark applied to the film is read by second reading device. In accordance with the printing information read by the second reading device, an image recorded on the photographic film is printed onto a photographic printing paper in a state in which the cartridge and the photographic film are separated from each other.

27 Claims, 6 Drawing Sheets

PHOTOGRAPHIC PRINTING SYSTEM AND PHOTOGRAPHIC PRINTING METHOD

BACKGROUND OF THE INVENTION

1. Field of the Invention

The present invention relates to a photographic printing system and a photographic printing method in which a cartridge in which a photographic photosensitive material is accommodated is received from a customer, the photographic photosensitive material is removed from the cartridge, the photographic photosensitive material is developed, printing exposure onto a photographic printing paper is carried out in accordance with an image developed on the photographic photosensitive material, and finally, the cartridge, the photographic photosensitive material, and the photographic printing paper are collated and returned to the customer.

2. Description of the Related Art

In recent years, storing elements such as ICs or the like have been provided at cartridges for accommodating photographic photosensitive materials such as photographic films (such photographic photosensitive materials will be referred to simply as "photographic films" hereinafter), such that printing conditions for the respective frame images can be recorded in the IC. For such a cartridge provided with an IC, at the lab, information such as the printing conditions are read from the IC and a printing processing is carried out in accordance with the information. The cartridge is then returned to the customer which the photographic film accommodated therein.

When developing a photographic film accommodated in a cartridge, the photographic film is withdrawn from the cartridge, the photographic film and the cartridge are separated, and the photographic film is developed. There are also cases in which the photographic film is also left separated from the cartridge in the printing process which follows the developing process. In the printing process, a photographic film which is kept accommodated in the cartridge can be printed, but special carriers are needed in this case. In the case of a cartridge with an IC, the photographic film is separated from the cartridge. Thus, the photographic film may be erroneously printed on the basis of information stored in an IC for some other cartridge. Or, the photographic film may erroneously be accommodated back into a different cartridge after the printing processing is completed.

SUMMARY OF THE INVENTION

In view of the aforementioned, an object of the present invention is to provide a photographic printing system and photographic printing method in which, even if the photographic film is separated from the cartridge in which the photographic film was accommodated, printing can be carried out with the photographic film and the cartridge surely corresponding to each other, and the photographic film and cartridge can be returned to the customer.

A first aspect of the present invention is a photographic printing system comprising: separating means which separates a photographic photosensitive material, which is accommodated in a cartridge provided with a storing element for storing printing information, from the cartridge; identification mark applying means which applies to the photographic photosensitive material an identification mark for having the photographic photosensitive material and the cartridge correspond to one another; first reading means which reads printing information stored in the storing element; storing means which stores the identification mark and printing information read by the first reading means in correspondence with one another; second reading means which reads, from the storing means, printing information corresponding to the identification mark applied to the photographic photosensitive material; and printing means which, in a state in which the photographic photosensitive material and the cartridge are separated, prints, on the basis of printing information read by the second reading means, an image recorded on the photographic photosensitive material onto a photographic printing paper.

In the first aspect of the present invention, when the photographic photosensitive material, which is accommodated in the cartridge provided with the storing element for storing printing information, is separated from the cartridge by the separating means, the same identification mark as that of the cartridge is applied to the separated photographic photosensitive material by the identification mark applying means so that the photosensitive material and cartridge correspond to one another. Then, the identification mark and the printing information, which is stored in the storing element and is read by the first reading means, are stored in correspondence with one another in the storing means.

Then, second reading means reads the printing information corresponding to the identification mark applied to the photographic photosensitive material. On the basis of the printing information, the image recorded on the photographic photosensitive material is printed onto a photographic printing paper by the printing means in a state in which the photographic photosensitive material and the cartridge are separated.

In this way, even if the photosensitive material and the cartridge are separated from one another, by applying the same identification mark as that of the cartridge to the photographic photosensitive material, printing processing can be carried out with the photographic photosensitive material and the cartridge reliably corresponding to one another.

A second aspect of the present invention is a photographic printing system comprising: separating means which separates a photographic photosensitive material, which is accommodated in a cartridge provided with a storing element for storing printing information, from the cartridge; identification mark applying means which applies to the photographic photosensitive material and the cartridge an identification mark for having the photographic photosensitive material and the cartridge correspond to one another; first reading means which reads printing information stored in the storing element; storing means which stores the identification mark and printing information read from the first reading means in correspondence with one another; second reading means which reads, from the storing means, printing information corresponding to the identification mark applied to the photographic photosensitive material; printing means which, in a state in which the photographic photosensitive material and the cartridge are separated, prints, on the basis of printing information read by the second reading means, an image recorded on the photographic photosensitive material onto a photographic printing paper; accommodating means which, after printing by the printing means is completed, accommodates the photographic photosensitive material in the cartridge to which is applied the identification mark corresponding to the identification mark applied to the photographic photosensitive material.

In the second aspect, when the photographic photosensitive material, which is accommodated in the cartridge provided with the storing element for storing printing information, is separated from the cartridge by the separating means, the same identification mark is applied to the separated photographic photosensitive material and cartridge by the identification mark applying means so that the photographic photosensitive material and cartridge correspond to one another. Then, the identification mark and the printing information, which is stored in the storing element and is read by the first reading means, are stored in correspondence with one another in the storing means.

Further, the printing information corresponding to the identification mark applied to the photographic photosensitive material is read by the second reading means. In the state in which the photographic photosensitive material and the cartridge are separated from one another, the printing means prints, on the basis of the printing information, the image recorded on the photographic photosensitive material onto a photographic printing paper. Then, after printing by the printing means has been completed, the accommodating means accommodates the photographic photosensitive material into the cartridge to which is applied the identification mark corresponding to the identification mark applied to the photographic photosensitive material. In this way, the identification mark applied to the photographic photosensitive material and the identification mark applied to the cartridge are matched up with one another, and the photosensitive material is accommodated in the cartridge and the cartridge is returned to the customer. Thus, there is no erroneous accommodating of a photographic photosensitive material in a cartridge of another customer.

A third aspect of the present invention is a photographic printing method comprising the steps of: separating a photographic photosensitive material, which is accommodated in a cartridge provided with a storing element for storing printing information, from the cartridge, and before or after separating the photographic photosensitive material from the cartridge, applying an identification mark to the photographic photosensitive material so as to have the photographic photosensitive material and the cartridge correspond to one another; reading the printing information stored in the storing element, and storing the printing information and the identification mark in correspondence with one another; and reading the printing information corresponding to the identification mark applied to the photographic photosensitive material, and, on the basis of the printing information, printing an image recorded on the photographic photosensitive material onto a photographic printing paper in a state in which the photographic photosensitive material and the cartridge are separated.

In the third aspect of the present invention, the photographic photosensitive material, which is accommodated in the cartridge provided with the storing element for storing printing information, is separated from the cartridge. Either before or after separation, the same identification mark as that of the cartridge is applied to the photographic photosensitive material so as to have the photographic photosensitive material and the cartridge correspond to one another. Then, the printing information stored in the storing element is read, the printing information and the identification mark are stored in correspondence with each other, and the printing information corresponding to the identification mark applied to the photographic photosensitive material is read. On the basis of the printing information, the image recorded on the photographic photosensitive material is printed onto a photographic printing paper in the state in which the photographic photosensitive material and the cartridge are separated from each other. In this way, even when the photographic photosensitive material and the cartridge are separated, by applying the identification mark to the photographic photosensitive material, printing processing can be carried out with the photographic photosensitive material and the cartridge reliably corresponding to one another.

A fourth aspect of the present invention is a photographic printing method comprising the steps of: separating a photographic photosensitive material, which is accommodated in a cartridge provided with a storing element for storing printing information, from the cartridge, and before or after separating the photographic photosensitive material from the cartridge, applying an identification mark to the photographic photosensitive material and the cartridge so as to have the photographic photosensitive material and the cartridge correspond to one another; reading the printing information stored in the storing element and storing the printing information and the identification mark in correspondence with one another; reading the printing information corresponding to the identification mark applied to the photographic photosensitive material, and, on the basis of the printing information, printing an image recorded on the photographic photosensitive material onto a photographic printing paper in a state in which the photographic photosensitive material and the cartridge are separated; and accommodating the photographic photosensitive material in the cartridge to which is applied the identification mark corresponding to the identification mark applied to the photographic photosensitive material.

In the fourth aspect of the present invention, the photographic photosensitive material, which is accommodated in the cartridge provided with the storing element for storing printing information, is separated from the cartridge. Either before or after separation, an identification mark is applied to the photographic photosensitive material and the cartridge so as to have the photographic photosensitive material and the cartridge correspond to one another. Then, the printing information stored in the storing element is read, the printing information and the identification mark are stored in correspondence with each other, and the printing information corresponding to the identification mark applied to the photographic photosensitive material is read. On the basis of the printing information, the image recorded on the photographic photosensitive material is printed onto a photographic printing paper in the state in which the photographic photosensitive material and the cartridge are separated from each other. After printing, the photographic photosensitive material is accommodated in the cartridge to which is applied the identification mark corresponding to the identification mark applied to the photographic photosensitive material. In this way, the identification mark applied to the photographic photosensitive material and the identification mark applied to the cartridge are matched up with one another, and the photographic photosensitive material is accommodated in the cartridge and the cartridge is returned to the customer. Thus, there is no erroneous accommodating of a photographic photosensitive material in a cartridge of another customer.

In a fifth aspect of the present invention, the photographic printing method of the fourth aspect further comprises the steps of: reading the printing information corresponding to the identification mark applied to the photographic photosensitive material; storing the printing information in a cartridge provided with a storing element; and accommodating the photographic photosensitive material in the cartridge.

In the fifth aspect, when the photographic photosensitive material is to be accommodated in a cartridge, the printing information corresponding to the identification mark applied to the photographic photosensitive material is read. The printing information is stored in a cartridge provided with a storing element, and the photographic photosensitive material is accommodated in this cartridge. This cartridge may be a cartridge which previously accommodated the photographic photosensitive material, or may be a different cartridge. In this way, by reading the printing information and storing it at the cartridge, even cases in which a cartridge is lost or the like can be dealt with.

DESCRIPTION OF THE PREFERRED EMBODIMENTS

Embodiments of the present invention will be described hereinafter with reference to the accompanying drawings.

Figure 1:
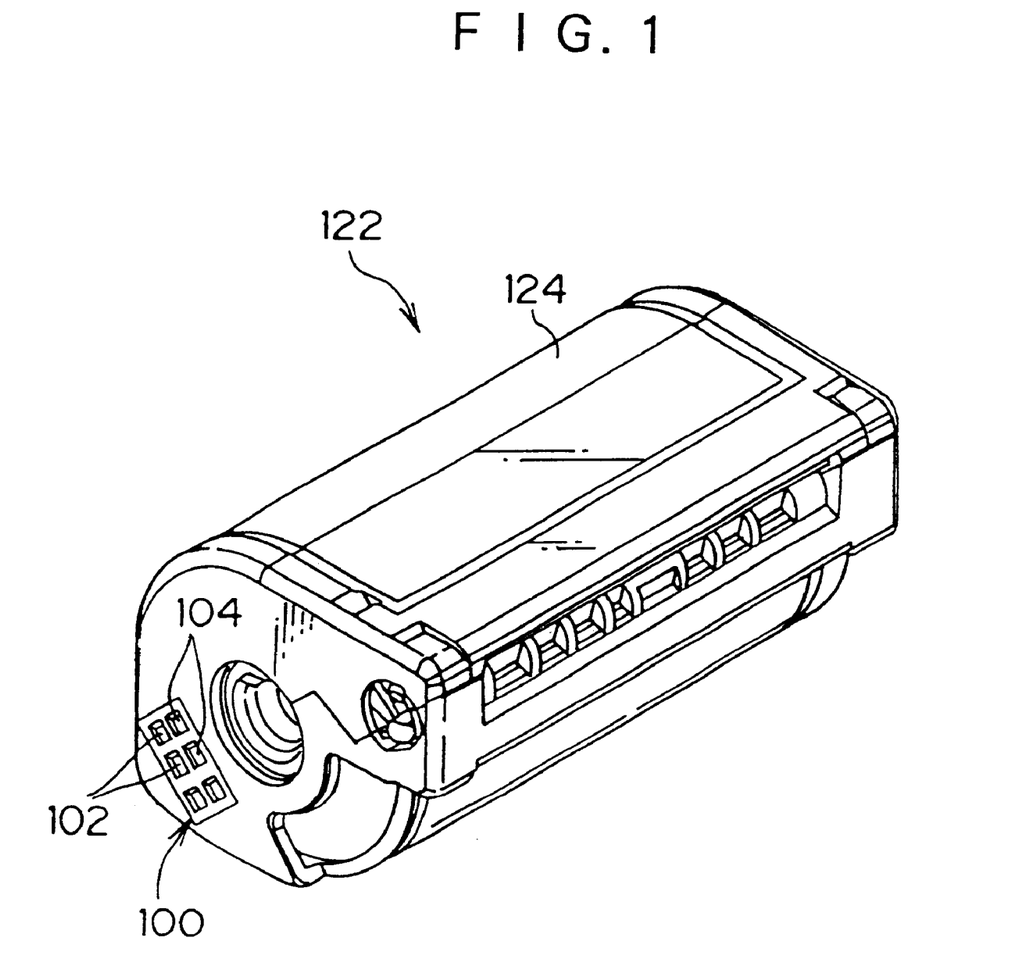
FIG. 1 is a perspective view of a cartridge relating to an embodiment of the present invention.
Figure 2:
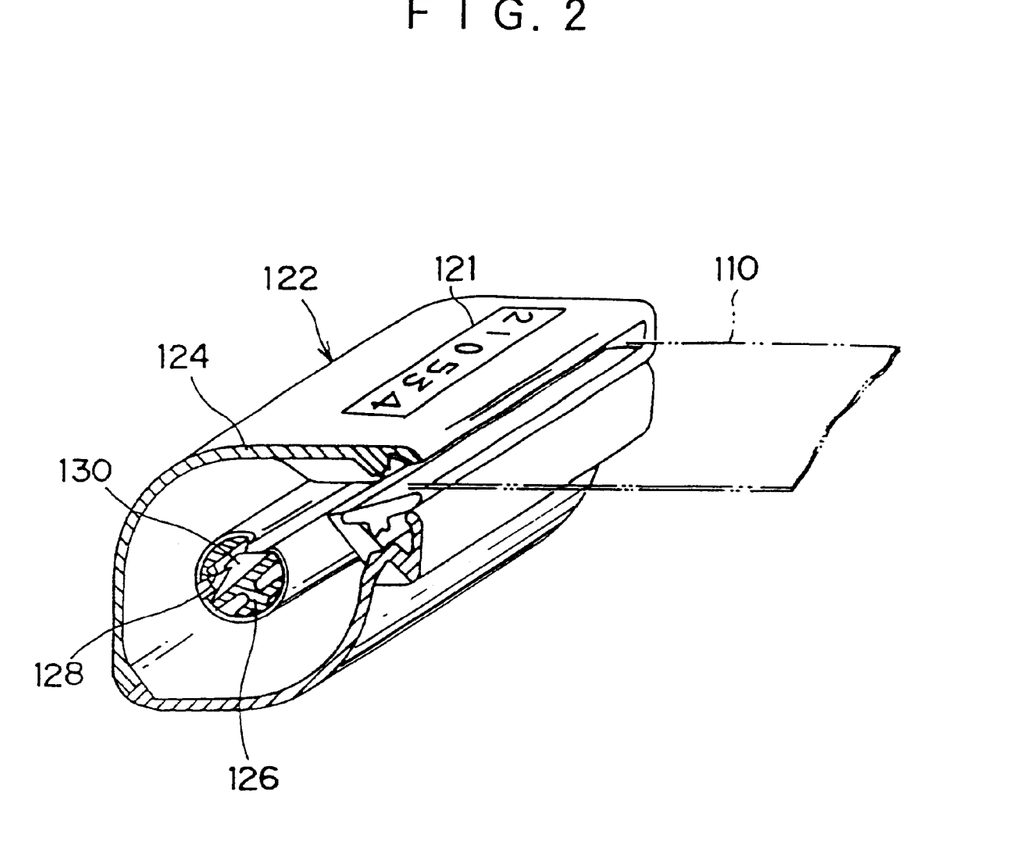
FIG. 2 is a perspective view wherein a portion of the casing is broken to show the interior structure of the cartridge illustrated in FIG. 1.

FIG. 1 and FIG. 2 illustrate a cartridge which is applied to an embodiment of the present invention.

Figure 3:
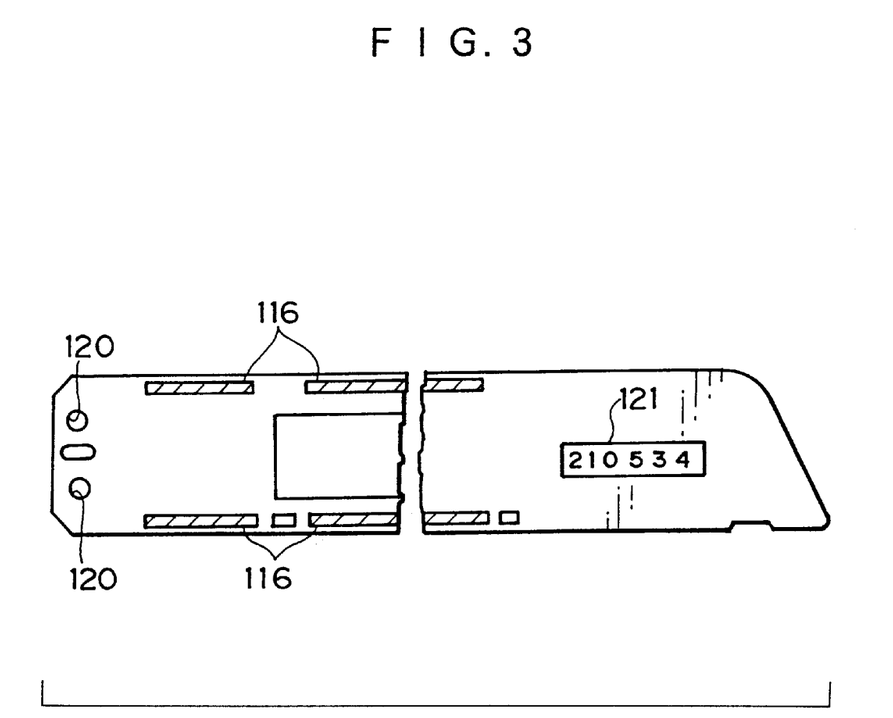
FIG. 3 is a plan view of an APS film.

A spool 126 which takes up a negative film 110 (see FIG. 2) in roll form is disposed inside a casing 124 of a cartridge 122. As shown in FIG. 3, magnetic recording layer 116 is provided on the negative film 110. The negative film 110 may be a 120-size or 220-size (brownie size) photographic film, a 240-size photographic film (a so called APS film), or the like.

As shown in FIG. 2, a slit-like through hole 128 is formed in the spool 126 along the axial direction thereof, and projecting pawls 130 are formed on an inner peripheral surface. By the projecting pawls 130 fitting into a pair of holes 120 (see FIG. 3) formed in the film 110, the trailing end portion of the film 110 is connected to the spool 126 and the film 110 is taken up in roll form by rotating the spool 126.

Further, the negative film 110 can be taken up into or drawn out from the cartridge 122 by rotating an axial end portion of the spool 126.

As illustrated in FIG. 1, in the present embodiment, an IC chip 100 which serves as a recording medium is embedded in the cartridge 122. A plurality (six in the present embodiment) of terminals 102 are provided in the IC chip 100. The main body of the IC chip 100 is embedded, but the terminals 102 are exposed from rectangular holes 104 provided at one end surface of the cartridge 122 in correspondence to the terminals 102.

Printing information of images recorded on the negative film 110 accommodated in the cartridge 122 is recorded on the IC chip 100. This printing information includes printing conditions (e.g., the aspect ratio, the printing format such as enlargement or reduction of the printing size, or the like); order information (the number of prints and the like); photographing information (the date of photographing, the place where photographing was carried out, and the conditions under which photographing was carried out); information on characters to be added (the data of the characters or pictures or the like to be added, the positional data expressing where the characters and the pictures are to be added, and the like); finishing processing information (sepia finishing, monochrome-finishing, soft focus, slender-look finishing, or the like); and the like. The aspect ratio includes C (standard) size, H (high vision) size, and P (panorama) size. Moreover, the enlargement and reduction of the printing size includes L size, 2L size, and 10×12 size, and the like.

At the time of printing, with reference to these information, the format for printing is determined in accordance with the printing conditions such as the aspect ratio, enlargement and reduction of the printing size, and the like, and the number of prints is determined in accordance with the order information. Further, the respective processings such as printing the year and date of photographing, the addition of characters, finishing processing and the like are carried out as needed on the basis of the photographing information, the information on characters to be added, and the finishing processing information mentioned above.

Moreover, in addition to the aforementioned printing information, it is possible to record in the IC chip 100, printing information such as edited data which is read data that the customer freely edited (e.g., the finishing processing or the addition of characters such as described above). Printing processing can be carried out on the basis of the edited data.

Summary of Photographic Printing System

Figure 4:
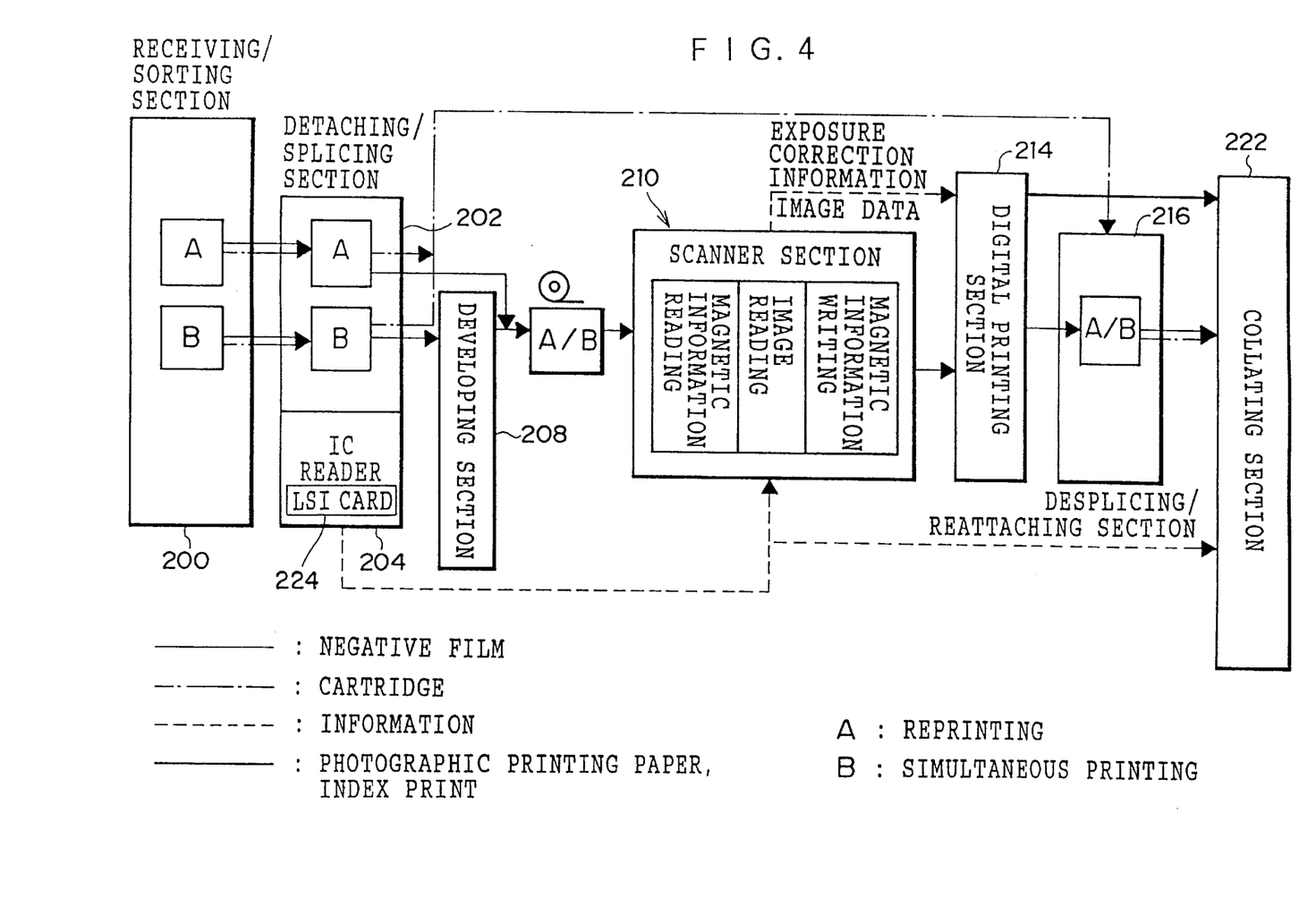
FIG. 4 is a structural view of a photographic printing system relating to the embodiment of the present invention.

FIG. 4 is a process diagram illustrating a photographic printing system relating to the embodiment of the present invention. In the photographic printing system, the cartridge 122 is first conveyed to a receiving/sorting section 200 and the following processing procedures are set depending on whether simultaneous prints are to be formed or reprints are to be formed.

"Receiving/Sorting Section 200"

At the receiving/sorting section 200, it is necessary to determine whether or not the received cartridge 122 is provided with the IC chip 100 and whether or not input of digital data of an index print into the IC chip 100 is desired.

At the receiving/sorting section 200, cartridges 122 are sorted into two different types: those designated in the figures and hereinafter by reference numeral B (i.e., cartridges 122 accommodating negative films 110 which are to be subjected to simultaneous printing) and those designated by reference numeral A (i.e., cartridges 122 accommodating negative films 110 which are to be subjected to reprinting). Then, the cartridge 122 is conveyed to the first process at a detaching/splicing section 202.

"Detaching/Splicing Section 202"

In the detaching/splicing section 202, the negative film 110 is drawn out from the cartridge 122, the trailing end portion thereof is detached from the spool 126, and a plurality of the negative films 110 are spliced together so as to produce an elongated roll film. Non-developed negative films 110 (for simultaneous printing) and developed negative films 110 (for reprinting) are spliced separately from each other, i.e., non-developed and developed negative films 110 are not spliced together. Further, if processing is to be carried out one cartridge at a time, the negative film 110 accommodated in a cartridge is not spliced together with other negative films 110, and is sent to the subsequent process.

Further, when the negative film 110 is separated from the cartridge 122, at the point in time that the leading end portion of the negative film 110 is slightly drawn out from the cartridge 122, an operator adheres check tapes 121 onto the negative film 110 and the cartridge 122, as shown in FIG. 2. and 3. Numbers (or characters) expressing a film ID code are marked on the check tapes 121. The check tapes 121 are used to correspond the negative film 110 and the cartridge 122 to each other.

An IC reader 204 is disposed in the detaching/splicing section 202. The IC reader 204 functions to read the information from the IC chip 100 provided at the cartridge 122.

The aforementioned printing information are read at the IC reader 204. The printing information which were read are stored in a LSI card (224 not shown) which is passed from process to process.

Moreover, at the detaching/splicing section 202, the film ID on the check tape 121 can, by a predetermined operation, be recorded on the LSI card so as to form a set together with the printing information read from the IC chip 100 of the corresponding cartridge 122.

For reprinting, there are cartridges 122 provided with the IC chip 100 and cartridges not provided with the IC chip 100. In the case of a cartridge not provided with the IC chip, the scanner section 210 is instructed to read the contents of the order recorded on the magnetic recording layer 116, as the contents of the order are recorded on the magnetic recording layer 116.

The transmission of information between the respective processes is not limited to transmission by the LSI card, and the magnetic recording layer 116 of the negative film 110 may be used, or information may be sent directly to a process (generally, the next process) as on-line data.

"Negative Film Developing Section 208"

The non-developed negative films 110, which are spliced together in roll form, are conveyed to a negative film developing section 208 wherein developing processing is carried out in a known film developing apparatus. The negative films 110 are then conveyed to the next process, a scanner section 210.

"Scanner Section 210"

The main operation carried out at the scanner section 210 is the digital reading of the images recorded on the negative film 110. Here, an index print is produced based on the digital data which is read. The index print has a small image recording surface. It suffices that the image recording surface of the index print is of a size which allows it to be known what images are recorded in the respective image frames. Thus, at this time, the images may be read at a relatively low resolution.

When the roll of negative films 110 is set at a predetermined position, the negative films 110 are drawn out from the outermost layer of the roll. The information recorded on the magnetic recording layers 116 of the respective negative films 110 and the printing information, which has been recorded on the IC chips 100 from the LSI cards, is read by the scanner section 210.

Further, at the scanner section 210, the film ID can be input in order to retrieve information which corresponds to the negative film 110. The printing information which corresponds to the negative film 110 is then retrieved from the LSI card, on the basis of the input film ID. If there is no printing information for printing in the IC chip 100, the information recorded on the magnetic recording layer 116 is utilized as the printing information.

When above-described processes (primarily, the reading of the information) are completed, the respective frame images are read at a high resolution in the scanner section 210.

"Digital Printer Section 214"

At the digital printer section 214, the image recorded on the negative film 110 (the image based on the image information read at high resolution) is printed onto a photographic printing paper (not illustrated). In the case of simultaneous printing, an index print is prepared for each film. At the time of reprinting, the designated frame image is positioned and the designated number of prints is printed. Printing is carried out by, for example, a scanning recording method in which a laser beam is scanned onto a photographic printing paper which is being conveyed, while the laser beam is oscillated in the main scanning direction by a polygon mirror and the like.

After the printing operation at the digital printer section 214, the photographic printing paper is taken up in roll form and is set in the printer main body in the state of being accommodated in the magazine.

The rolled negative film 110 for which printing processing has been completed is conveyed to the next process, a desplicing/reattaching section 216.

"Desplicing/Reattaching Section 216"

Cartridge magazines are conveyed to the desplicing / reattaching section 216.

"Desplicing/Reattaching Section 216"

Cartridge magazines are conveyed to the desplicing/ reattaching section 216. The film IDs, which are on the check tapes 121 adhered to the respective negative films 110 of the rolled negative film 110, and the film IDs, which are on the check tapes 121 adhered to the cartridges 122, are collated, and the negative films 110 are accommodated into the corresponding cartridges 122.

"Collating Section 222"

At the collating section 222, the negative film 110, the cartridge 122 in which the negative film 110 is accommodated, the photographic printing papers, and the index print are brought together, are collated on the basis of the IDs given thereto, are placed in a DP bag (not shown), and are returned to the customer.

Operation of the present embodiment will be described hereinafter. The flow of the operation in the above-described photographic printing system is set forth below.

As shown in FIG. 4, there are two types of the cartridges 122 which are received. Reference numeral A indicates reprinting, and B represents simultaneous printing.

At the detaching/splicing section 202, for both reference numerals A and B, print information is read by the IC reader 204 from the IC chip 100 provided at the cartridge 122, and the read information is recorded onto an LSI card. Then, the leading end portion of the negative film 110 is drawn out slightly, and the check tapes 121 are adhered to the cartridge 122 and the negative film 110 as shown in FIGS. 2 and 3. On the check tapes 121 are marked numbers (characters) expressing the film ID in order to be able to correspond the cartridge 122 and the negative film 110 to one another. Thereafter, all of the negative film 110 is drawn out, and the trailing end portion thereof is detached from the spool 126. A plurality of negative films 110 are spliced together into an elongated form so as to form a roll film.

Next, by performing a predetermined operation, the film ID on the check tape is recorded onto the LSI card so as to form a set together with the printing information read from the IC chip 100.

Reference numeral B indicates simultaneous printing, and A represents reprinting. Negative films 110 corresponding to B are therefore developed at the developing section 208, while negative films 110 corresponding to A are not processed at the developing section 208. Then, negative films 110 corresponding to both reference numerals A and B are conveyed to the scanner section 210.

At the scanner section 210, the operator carries out a predetermined operation so as to input the film ID on the check tape 121 adhered on the negative film 110. The input film ID is collated with the printing information recorded on the LSI card, and the printing information corresponding to the input film ID is read from the LSI card.

At the scanner section 210, magnetic information are read from the rolled negative films 110 which were conveyed in. In the case of simultaneous printing, the digital data for producing the index print is read from all frame images at a low resolution. On the other hand, in the case that reprinting is to be carried out, the needed frame images are first selected, and then the image reading process is performed (at a low resolution).

Next, exposure correction information for the image frame to be printed is obtained, and the image is read at a high resolution. The exposure correction information is then transmitted to the printer section 214 together with the printing information read from the LSI card, and is written onto the magnetic recording layer 116.

At the digital printer section 214, each frame image to be printed is positioned at the printing position, and printing exposure processing is carried out in accordance with the image data, the exposure correction information, and the printing information which were transmitted from the scanner section 210. The rolled negative films 110 for which printing exposure processing is completed are then conveyed to the reattaching/desplicing section 216.

The cartridges 122, from which the negative films 110 were separated previously, are conveyed to the reattaching/desplicing section 216.

The operator collates the film ID on the check tape 121 adhered to the negative film 110 and the film ID on the check tape 121 adhered to the cartridge 122, and accommodates the negative films 110 into the corresponding cartridges 122.

The cartridges 122 are then conveyed to the collation section 222 with the photographic printing papers and the index prints. At the collation section 222, the respective photographic materials mentioned above (the cartridges 122, the photographic printing papers, and the index prints) are collated, are accommodated into DP bags, and are returned to the customers.

As described above, even in cases in which the negative film 110 is subjected to developing processing and printing processing while separated from the cartridge 122, the negative film 110 and the cartridge 122 can be easily matched up together by adhering the check tapes 121, on which the film ID is marked, onto he negative film 110 and the cartridge 122, and collating the negative film 110 and the cartridge 122 on the basis of the check tapes 121. Therefore, it is possible to avoid erroneously printing an image on the basis of printing information recorded on the IC chip of some other cartridge, and to avoid erroneously accommodating the negative film 110 into the cartridge 122 which does not correspond thereto.

In the above embodiment, a case in which the negative film 110 is returned to the original cartridge 122 is described as an example. However, the printing information recorded on the LSI card corresponding to the negative film 110 may be stored in the IC chip 100 of another cartridge 122, and the negative film 110 may be accommodated in this other cartridge 122. Thus, cases in which the original cartridge 122 is lost or the like can be dealt with.

In the embodiment described above, a case in which the check tapes 121 are adhered onto the negative film 110 and the cartridge 122 was described as an example. However, the film ID may be automatically recorded on the cartridge 122 and on the negative film 110.

Figure 5:
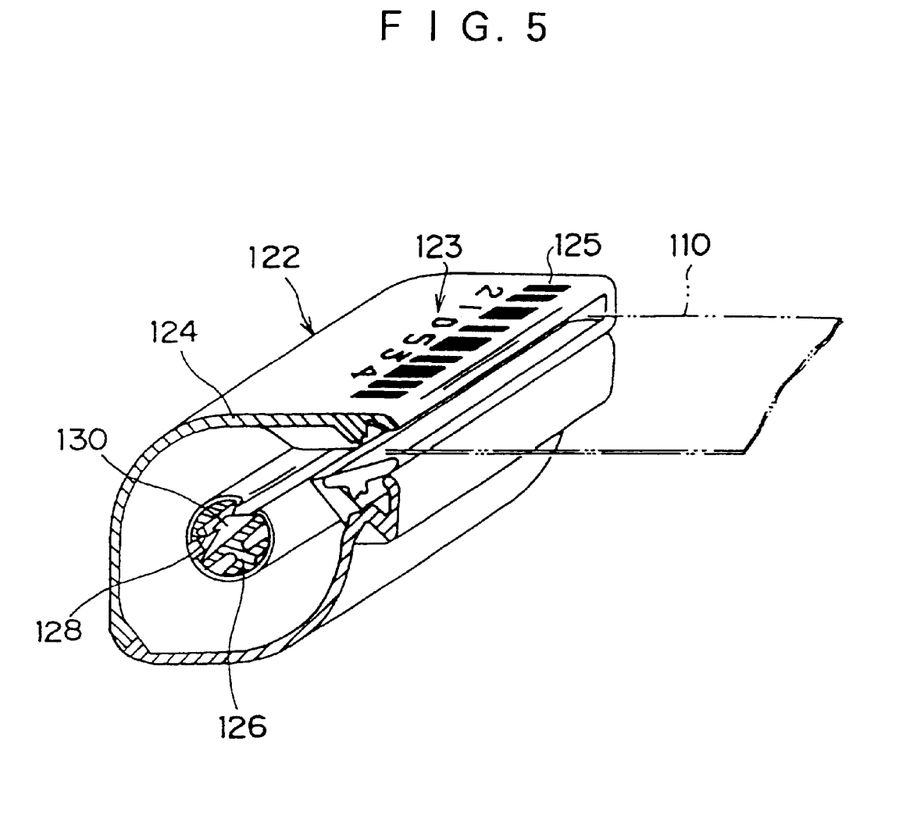
FIG. 5 is a perspective view illustrating another example of a cartridge wherein a portion of the casing is broken to show the interior structure.
Figure 6:
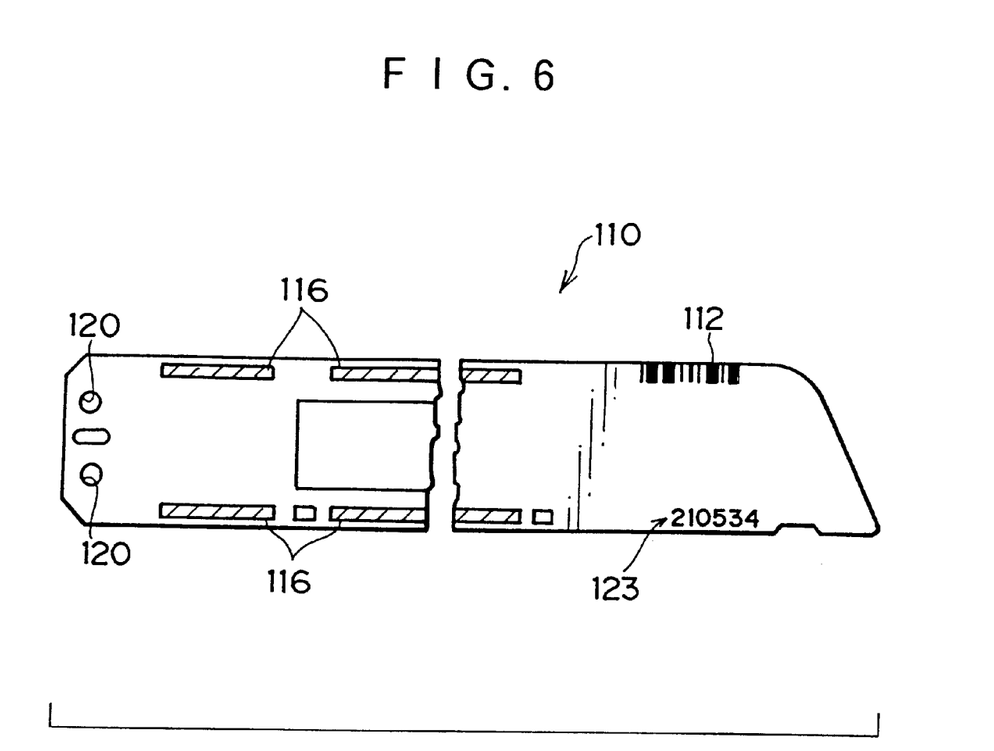
FIG. 6 is a plan view of another example of an APS film.

For example, as shown in FIG. 5, a bar code 125 which represents the film ID 123 can be printed together with the film ID 123 on the outer peripheral surface of the cartridge 122 at the detaching/splicing section 202. In addition, a bar code 112 which expresses the film ID 123 can be printed on the leading end portion of the negative film 110.

The bar code 112 which is printed on the negative film 110 at the detaching/splicing section 202 is read to obtain the film ID, and is recorded on the LSI card as a set together with the printing information read from the IC chip 100 by the IC reader 204.

At the scanner section 210, the bar code 112 printed on the negative film 110 is read to obtain the film ID, and the film ID is collated with the film ID recorded on the LSI card, and the printing information corresponding thereto is obtained. Moreover, at the desplicing/reattaching section 216 as well, the bar code 112 printed on the negative film 110 and the bar code 125 printed on the cartridge 112 are respectively read and are collated with one another in order to accommodate the negative film 110 into the corresponding cartridge 122.

In this way, the processings of the respective processes can be carried out with the negative films 110 corresponding reliably with the cartridges 122, without the need for work on the part of the operator.

Further, the film ID may be recorded as a bar code on the negative film 110 and on the cartridge 122 in advance at the time of manufacturing. Or, the film ID may be recorded in the IC chip 100 of the cartridge 122. The film ID may also be recorded on the magnetic recording layer of the negative film 110 at the lab.

Although the digital printing was used as an example in the embodiment described above, the present invention is also applicable to regular analog printing.

As described above, the present invention provides the superior effect that, even when a photographic photosensitive material is separated from a cartridge, the processings of various processes can be carried out with the photographic photosensitive material and the cartridge being made to reliably correspond to one another on the basis of the identification marks applied thereto.

What is claimed is:

1. A photographic printing system comprising:

a separating mechanism which separates a photographic photosensitive material, which is accommodated in a cartridge provided with a storing element for storing printing information, from the cartridge;

an identification mark applying mechanism which applies to the photographic photosensitive material an identification mark for having the photographic photosensitive material and the cartridge correspond to one another;

a first reading mechanism which reads printing information stored in the storing element;

a storing mechanism which stores the identification mark and printing information read by the first reading mechanism in correspondence with one another;

a second reading mechanism which reads, from the storing mechanism, printing information corresponding to the identification mark applied to the photographic photosensitive material; and a printer which, in a state in which the photographic photosensitive material and the cartridge are separated, prints, on the basis of printing information read by the second reading mechanism, an image recorded on the photographic photosensitive material onto a photographic printing paper.

2. A photographic printing system according to claim 1, wherein the cartridge has an IC chip which is embedded in a first end surface of the cartridge and which has a plurality of terminals exposed from rectangular holes corresponding to the respective terminals.

3. A photographic printing system according to claim 2, wherein the cartridge has:

a cylindrical spool;

a slit-like through hole formed along an axial direction of the spool inside said spool; and a projecting pawl formed on an inner peripheral surface of the through hole and fitting into a hole provided in the photographic photosensitive material.

4. A photographic printing system according to claim 1, wherein the photographic photosensitive material has a magnetic recording layer.

5. A photographic printing system according to claim 1, wherein said first reading mechanism has:

an IC reader which reads information from an IC chip of the cartridge; and a recording medium.

6. The photographic printing system of claim 1, wherein the storing element for storing printing information is embedded with the cartridge.

7. The photographic printing system according to claim 6, wherein said printing information comprises at least one of aspect ratio and finishing process information.

8. The photographic printing system of claim 1, wherein the photographic sensitive material includes a plurality of frames, and wherein the storing element stores print information on a frame-by-frame basis according to information set by a user.

9. The photographic printing system of claim 8, wherein the print information is provided at a time of taking a photograph image for each frame.

10. A photographic printing system comprising:

a separating mechanism which separates a photographic photosensitive material, which is accommodated in a cartridge provided with a storing element for storing printing information, from the cartridge;

an identification mark applying mechanism, which applies to the photographic photosensitive material and the cartridge an identification mark for having the photographic photosensitive material and the cartridge correspond to one another;

a first reading mechanism which reads printing information stored in the storing element;

a storing mechanism which stores the identification mark and printing information read from the first reading mechanism in correspondence with one another;

a second reading mechanism which reads, from the storing mechanism, printing information corresponding to the identification mark applied to the photographic photosensitive material;

a printer which, in a state in which the photographic photosensitive material and the cartridge are separated, prints, on the basis of printing information read by the second reading mechanism, an image recorded on the photographic photosensitive material onto a photographic printing paper; and an accommodating mechanism which, after printing by the printer is completed, accommodates the photographic photosensitive material in the cartridge to which is applied the identification mark corresponding to the identification mark applied to the photographic photosensitive material.

11. A photographic printing system according to claim 10, wherein the photographic photosensitive material has a magnetic recording layer.

12. The photographic printing system of claim 10, wherein the storing element for storing printing information is embedded with the cartridge.

13. The photographic printing system according to claim 12, wherein said printing information comprises at least one of aspect ratio and finishing process information.

14. The photographic printing system of claim 10, wherein the photographic sensitive material includes a plurality of frames, and wherein the storing element stores print information on a frame-by-frame basis according to information set by a user.

15. The photographic printing system of claim 14, wherein the print information is provided at a time of taking a photograph image for each frame.

16. A photographic printing method comprising the steps of:

separating a photographic photosensitive material, which is accommodated in a cartridge provided with a storing element for storing printing information, from the cartridge, and before or after separating the photographic photosensitive material from the cartridge, applying an identification mark to the photographic photosensitive material so as to have the photosensitive material and the cartridge correspond to one another;

reading the printing information stored in the storing element, and storing the printing information and the identification mark in correspondence with one another; and reading the printing information corresponding to the identification mark applied to the photographic photosensitive material, and, on the basis of the printing information, printing an image recorded on the photographic photosensitive material onto a photographic printing paper in a state in which the photographic photosensitive material and the cartridge are separated.

17. A photographic printing method according to claim 16, wherein the identification mark is a check tape on which a film ID is expressed, and the check tape is adhered to an end portion of the photographic photosensitive material and to a surface of the cartridge.

18. A photographic printing method according to claim 16, wherein, by inputting the identification mark to a recording medium together with image designating information at a time of reprinting, an image corresponding to the image designating information is selected from the printing information recorded in correspondence with the identification mark, and the image is printed onto a photographic printing paper.

19. The photographic printing method of claim 16, wherein the photographic sensitive material includes a plurality of frames, said method further comprising storing print information to the storing element on a frame-by-frame basis according to information set by a user.

20. The photographic printing method of claim 19, wherein the print information is provided at a time of taking a photograph image for each frame.

21. A photographic printing method comprising the steps of:

separating a photographic photosensitive material, which is accommodated in a cartridge provided with a storing element for storing printing information, from the cartridge, and before or after separating the photographic photosensitive material from the cartridge, applying an identification mark to the photographic photosensitive material and the cartridge so as to have the photographic photosensitive material and the cartridge correspond to one another;

reading the printing information stored in the storing element and storing the printing information and the identification mark in correspondence with one another;

reading the printing information corresponding to the identification mark applied to the photographic photosensitive material, and, on the basis of the printing information, printing an image recorded on the photographic photosensitive material onto a photographic printing paper in a state in which the photographic photosensitive material and the cartridge are separated; and accommodating the photographic photosensitive material in the cartridge to which is applied the identification mark corresponding to the identification mark applied to the photographic photosensitive material.

22. A photographic printing method according to claim 21, further comprising the steps of:

reading the printing information corresponding to the identification mark applied to the photographic photosensitive material;

storing the printing information in a cartridge provided with a storing element; and accommodating the photographic photosensitive material in the cartridge.

23. A photographic printing method according to claim 22, wherein the identification mark is a check tape on which a film ID is expressed, and the check tape is adhered to an end portion of the photographic photosensitive material and to a surface of the cartridge.

24. A photographic printing method according to claim 21, wherein the identification mark is a check tape on which a film ID is expressed, and the check tape is adhered to an end portion of the photographic photosensitive material and to a surface of the cartridge.

25. A photographic printing method according to claim 21, wherein, by inputting the identification mark to a recording medium together with image designating information at a time of reprinting, an image corresponding to the image designating information is selected from the printing information recorded in correspondence with the identification mark, and the image is printed onto a photographic printing paper.

26. The photographic printing method of claim 21, wherein the photographic sensitive material includes a plurality of frames, said method further comprising storing print information to the storing element on a frame-by-frame basis according to information set by a user.

27. The photographic printing method of claim 26, wherein the print information is provided at a time of taking a photograph image for each frame.

* * * * *

UNITED STATES PATENT AND TRADEMARK OFFICE
CERTIFICATE OF CORRECTION

PATENT NO.   : 6,396,564 B2
DATED        : May 28, 2002
INVENTOR(S)  : Setsuji Tatsumi It is certified that error appears in the above-identified patent and that said Letters Patent is hereby corrected as shown below:

<u>Title page,</u>
Item [56], FOREIGN PATENT DOCUMENTS, please delete "A 6-9869" and insert -- A 07-219201 --; and delete "A 0-7539" and insert -- 09-197539 --.

Signed and Sealed this

Fifteenth Day of October, 2002

*Attest:*

*Attesting Officer*

JAMES E. ROGAN
*Director of the United States Patent and Trademark Office*